US012260041B2

(12) United States Patent
Wang et al.

(10) Patent No.: US 12,260,041 B2
(45) Date of Patent: Mar. 25, 2025

(54) TOUCH PANEL AND TOUCH DRIVING METHOD FOR SWITCHING INTO DIFFERENT WORKING MODES ACCORDING TO DIFFERENT APPLICATION SCENARIOS

(71) Applicants: Wuhan China Star Optoelectronics Technology Co., Ltd., Hubei (CN); Wuhan China Star Optoelectronics Semiconductor Display Technology Co., Ltd., Hubei (CN)

(72) Inventors: Yanan Wang, Hubei (CN); Yalong Ma, Hubei (CN); Zengjian Jin, Hubei (CN)

(73) Assignees: Wuhan China Star Optoelectronics Technology Co., Ltd., Wuhan (CN); Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 17/600,275

(22) PCT Filed: Sep. 3, 2021

(86) PCT No.: PCT/CN2021/116388
§ 371 (c)(1),
(2) Date: Feb. 16, 2023

(87) PCT Pub. No.: WO2023/015628
PCT Pub. Date: Feb. 16, 2023

(65) Prior Publication Data
US 2024/0019961 A1 Jan. 18, 2024

(30) Foreign Application Priority Data
Aug. 13, 2021 (CN) .......................... 202110930919.0

(51) Int. Cl.
*G06F 3/041* (2006.01)

(52) U.S. Cl.
CPC ........ *G06F 3/04164* (2019.05); *G06F 3/0418* (2013.01)

(58) Field of Classification Search
CPC .......................... G06F 3/04164; G06F 3/0418
See application file for complete search history.

(56) References Cited

U.S. PATENT DOCUMENTS

| 10,042,484 | B1* | 8/2018 | O'Connor | G06F 3/0443 |
| 2011/0279408 | A1* | 11/2011 | Urano | G06F 3/0446 |
| | | | | 345/173 |

(Continued)

FOREIGN PATENT DOCUMENTS

| CN | 106201141 | 12/2016 |
| CN | 107479742 | 12/2017 |

(Continued)

OTHER PUBLICATIONS

International Search Report and the Written Opinion Dated May 6, 2022 From the International Searching Authority Re. Application No. PCT/CN2021/116388 and Its Translation Into English. (14 Pages).

(Continued)

*Primary Examiner* — Afroza Chowdhury (57) ABSTRACT

A touch panel and a touch driving method are provided. The touch panel includes a touch sensing unit set, wherein the touch sensing unit set includes touch sensing units; a driving signal line set, wherein the driving signal set includes driving signal lines, and one of the driving signal lines is electrically connected to one of the touch sensing units; and a touch circuit corresponding to the driving signal line set, wherein the touch circuit includes a plurality of thin film transistors (TFT), gates of the thin film transistors are connected to each other, sources/drains of the thin film transistors are connected to each other, and the drain/source (Continued)

of the thin film transistors is electrically connected to one of the driving signal lines.

16 Claims, 6 Drawing Sheets

(56) References Cited

U.S. PATENT DOCUMENTS

| | | | |
|---|---|---|---|
| 2015/0077387 A1* | 3/2015 | Han | G06F 3/0445 |
| | | | 345/174 |
| 2017/0003815 A1* | 1/2017 | Xi | G06F 3/04166 |
| 2017/0123546 A1* | 5/2017 | Zhan | G06F 3/0446 |
| 2017/0277310 A1* | 9/2017 | Xiong | G06F 3/0412 |
| 2019/0025966 A1* | 1/2019 | Xing | G06F 3/044 |
| 2021/0048718 A1* | 2/2021 | Huang | G02F 1/134309 |

FOREIGN PATENT DOCUMENTS

| | | |
|---|---|---|
| JP | 2011-242906 | 12/2011 |
| JP | 2014-134900 | 7/2014 |
| KR | 10-2015-0030979 | 3/2015 |

OTHER PUBLICATIONS

Notification of Office Action and Search Report Dated Apr. 20, 2023 From The State Intellectual Property Office of the People's Republic of China Re. Application No. 202110930919.0 and Its Translation Into English. (17 Pages).

* cited by examiner

FIG. 4 configurating a touch panel such that the touch panel has a first working mode responsive to a first application scenario and a second working mode responsive to a second application scenario, and setting a report rate of the touch panel responsive to the first application scenario is less than a report rate responsive to the second application scenario, and an touch accuracy of the touch panel responsive to the first application scenario is greater than an touch accuracy of the touch panel responsive to the second application scenario ~ S1 switching between the first working mode and the second working mode according to the application scenario of touch panel ~ S2

TOUCH PANEL AND TOUCH DRIVING METHOD FOR SWITCHING INTO DIFFERENT WORKING MODES ACCORDING TO DIFFERENT APPLICATION SCENARIOS

RELATED APPLICATIONS

This application is a National Phase of PCT Patent Application No. PCT/CN2021/116388 having International filing date of Sep. 3, 2021, which claims the benefit of priority of Chinese Patent Application No. 202110930919.0 filed on 1 Aug. 13, 2021. The contents of the above applications are all incorporated by reference as if fully set forth herein in their entirety.

FIELD AND BACKGROUND OF THE INVENTION

The present disclosure relates to the field of touch technologies, and more particularly, to a touch panel and a touch driving method.

With the development of display technology, touch screens are used as a kind of positioning and displaying input device, and users may manipulate the display of the touch screens by touching, dragging, and gesturing. Currently, the touch screens provide a simple, convenient and natural man-machine interaction means. The touch screens have many advantages such as sturdiness, durability, fast response times, space saving, and easy communication, which meet the development trend of thin electronic products.

Currently, the touch screens are mainly composed of a glass cover plate and touch sensors (touch driving electrodes and touch sensing electrodes), and the touch sensors in the touch screens play a critical role. When the touch sensors sense a touch of our finger or a touch of a stylus, the touch sensors can realize the touch function. Therefore, the touch sensors are indispensable components in the touch screens.

Generally, a size of the finger touch is about 5 mm, and a size of a tip of the stylus is smaller, about 1 mm. The touch panel has a low physical resolution, and then a size of a sensor unit may perform a better positioning recognition when the sensor unit is touched by a finger. However, if the stylus is used to touch the touch panel, the accuracy of the detected touch position is relatively low, so that the touch accuracy of the touch position is relatively low. The existing touch panels on the market only have one working mode, so that on the same device, the touch panel cannot have high touch accuracy and high report rate according to different application scenarios.

Technical Problems

The technical problem to be solved by the present disclosure is how to realize an extremely narrow bezel design.

SUMMARY OF THE INVENTION

Technical Solutions

In order to solve the above problems, the technical solutions provided by the present disclosure are as follows:

The present disclosure provides a touch panel and a touch driving method that can switch into different working modes according to different application scenarios, and the touch panel and the touch driving method can achieve both high touch accuracy and high report rate.

The present disclosure provides a touch panel, the touch panel includes:
at least one touch sensing unit set, wherein the touch sensing unit set includes at least two touch sensing units;
at least one driving signal line set, wherein the driving signal line set includes at least two driving signal lines, one of the driving signal lines in the driving signal line set is electrically connected to one of the touch sensing units in the touch sensing unit set; and
at least one touch circuit, the touch circuit corresponding to the driving signal line set; wherein the touch circuit includes at least two switching thin film transistors, gates of the switching thin film transistors in the touch circuit are connected to each other, sources/drains of the switching thin film transistors in the touch circuit are connected to each other, and the drain/source of one of the switching thin film transistors in the touch circuit is electrically connected to one corresponding driving signal line.

In one optional embodiment of the present disclosure, the touch panel includes m touch sensing unit sets, m driving signal line sets, and m touch circuits, each of the touch sensing unit sets includes n touch sensing units, each of the driving signal line sets includes n driving signal lines, and each of the touch circuits includes n switching thin film transistors, wherein m≥1, n≥2, m and n are both positive integers, the switching thin film transistors correspond to the driving signal lines in a one-to-one correspondence, and the driving signal lines correspond to the touch sensing units in a one-to-one correspondence.

In one optional embodiment of the present disclosure, each of the driving signal line sets further includes n driving signal access lines, an end of each of the driving signal access lines is connected to an end of one corresponding driving signal line away from the touch sensing units and the source/drain of one of the switching thin film transistors, and the other end of each of the driving signal access lines receives a driving signal.

In one optional embodiment of the present disclosure, the touch panel further includes columns of touch sensing units arranged side by side, wherein each of the columns of touch sensing units includes a plurality of touch sensing unit sets, one of the columns of touch sensing units corresponds to a touch circuit module set, the touch circuit module set includes m/a touch circuits, wherein a≥1, and a is a positive integer.

In one optional embodiment of the present disclosure, outlines of two adjacent touch sensing unit sets do not intersect with each other, and the number and the arrangement of the touch sensing units in each row in the touch sensing unit set are both the same.

In one optional embodiment of the present disclosure, outlines of two adjacent touch sensing units partially intersect, and the number of the touch sensing units in at least one row in the touch sensing unit set is different from the number of the touch sensing units in the other rows.

In one optional embodiment of the present disclosure, the touch circuit includes a first working mode and a second working mode; in response to that the touch circuit is switched to the first working mode, the switching thin film transistor is turned off, and each of the driving signal lines drives one corresponding touch sensing unit; in response to that the touch circuit is switched to the second working mode, the switching thin film transistor is turned on, and any one of the driving signal lines in the driving signal line set simultaneously drives all the touch sensing units in the touch sensing unit set.

In one optional embodiment of the present disclosure, the first working mode is responsive to a first application scenario, the second working mode is responsive to a second application scenario, a report rate of the touch panel responsive to the first application scenario is less than a report rate of the touch panel responsive to the second application scenario, and an accuracy of the touch panel responsive to the first application scenario is greater than an accuracy of the touch panel responsive to the second application scenario.

A second aspect of the present disclosure provides a touch driving method, the touch driving method includes steps of:
 configurating a touch panel as described above, so that the touch panel has a first working mode responsive to a first application scenario and a second working mode responsive to a second application scenario, and setting a report rate of the touch panel responsive to the first application scenario is less than a report rate responsive to the second application scenario, and setting a touch accuracy of the touch panel responsive to the first application scenario is greater than a touch accuracy of the touch panel responsive to the second application scenario; and
 controlling the turning on and the turning off of the switching thin film transistors in the touch circuit of the touch panel to switch the touch panel between the first working mode and the second working mode, according to the application scenario of the touch panel.

Beneficial Effect

In the touch panel, the touch circuit, and the touch driving method provided by the present disclosure, a touch circuit module set is added to an existing touch panel, wherein the plurality of touch circuit in the touch circuit module set are electrically connected to the touch sensing units in the touch sensing unit set through the driving signal lines in the driving signal line set, and the touch circuit are electrically connected to the driving signal lines through the plurality of switching thin film transistors. By controlling turning on or turning off of the switching thin film transistors, in the first working mode (higher requirements for touch accuracy) responsive to the first application scenario, the touch panel can control one touch sensing unit through one driving signal line and the touch panel has a higher touch accuracy, and in the second working mode (lower requirements for touch accuracy) responsive to the second application scenario, the touch panel can simultaneously drive a set of multiple touch sensing units through one driving signal line, which can reduce the driving response time and make the signal transmission process faster, thereby greatly improving the report rate. That is, the touch panel and the touch driving method provided by the present disclosure can switch into different working modes according to different application scenarios, and the touch panel and the touch driving method can achieve both high touch accuracy and high report rate.

In addition, in the second working mode responsive to the second application scenario, the report rate of the touch panel provided by the present disclosure is increased by at least n−1 times (n is the number of the touch sensing units in one touch sensing unit set, and n≥2), which reduces the driving response times, makes the signal transmission process faster, increases the user experience, and expands the application of the touch panel.

BRIEF DESCRIPTION OF THE SEVERAL VIEWS OF THE DRAWINGS

In order to more clearly describe the technical solutions in the embodiments of the present application, the following will briefly introduce the drawings needed in the description of the embodiments. Obviously, the drawings in the following description are only some embodiments of the present application. For those skilled in the art, without creative work, other drawings can be obtained based on these drawings.

DESCRIPTION OF SPECIFIC EMBODIMENTS OF THE INVENTION

The technical solutions in the embodiments of the present disclosure will be clearly and completely described below in conjunction with the drawings in the embodiments of the present disclosure. Obviously, the described embodiments are only a part of the embodiments of the present disclosure, rather than all the embodiments. Based on the embodiments in the present disclosure, all other embodiments obtained by those skilled in the art without creative work shall fall within the protection scope of the disclosure.

In the description of this application, it should be understood that the orientation or positional relationship indicated by the terms "upper" and "lower" are based on the orientation or positional relationship shown in the drawings. It is only for the convenience of describing the application and simplifying the description, rather than indicating or implying that the device or element referred to must have a specific orientation, be constructed and operated in a specific orientation, and therefore cannot be construed as a limitation of the disclosure. In addition, the terms "first" and "second" are only used for descriptive purposes and cannot be understood as indicating or implying relative importance or implicitly indicating the number of indicated technical features. Therefore, the features defined with "first" and "second" may explicitly or implicitly include one or more of the features. In the description of the present disclosure, "a plurality of" means two or more than two, unless otherwise specifically defined.

The preset disclosure may repeat reference numerals and/or reference letters in different implementations, and this repetition is for the purpose of simplification and clarity and does not itself indicate the relationship between the various embodiments and/or settings discussed.

The present disclosure is for the technical problem that existing touch panels on the market only have one working mode, so that on the same device, the touch panel cannot have high touch accuracy and high report rate according to different application scenarios. A touch circuit module set is added to the existing touch panel, wherein the plurality of touch circuits in the touch circuit module set are electrically connected to the touch sensing units in the touch sensing unit set through the driving signal lines in the driving signal line set, and the touch circuit are electrically connected to the driving signal lines through the plurality of switching thin film transistors. By controlling turning on or turning off of the switching thin film transistors, in the first working mode responsive to the first application scenario, the touch panel can control one touch sensing unit through one driving signal line and the touch panel has a higher touch accuracy; and in the second working mode responsive to the second application scenario, the touch panel can simultaneously drive a set of multiple touch sensing units through one driving signal line, which can reduce the driving response times and make the signal transmission process faster, thereby greatly improving the report rate. In this way, the goal of achieving both high touch accuracy and high report rate can be realized.

Please refer to FIG. 1 to FIG. 4, a first embodiment of the present disclosure provides a touch panel 100. The touch panel 100 includes m touch sensing unit sets 10, m driving signal line sets 20, and at least one touch circuit module set 30. The m driving signal line sets 20 are electrically connected to the m touch sensing unit sets 10 and the touch circuit module set 30, respectively, wherein m≥1 and m is a positive integer.

Figure 1:
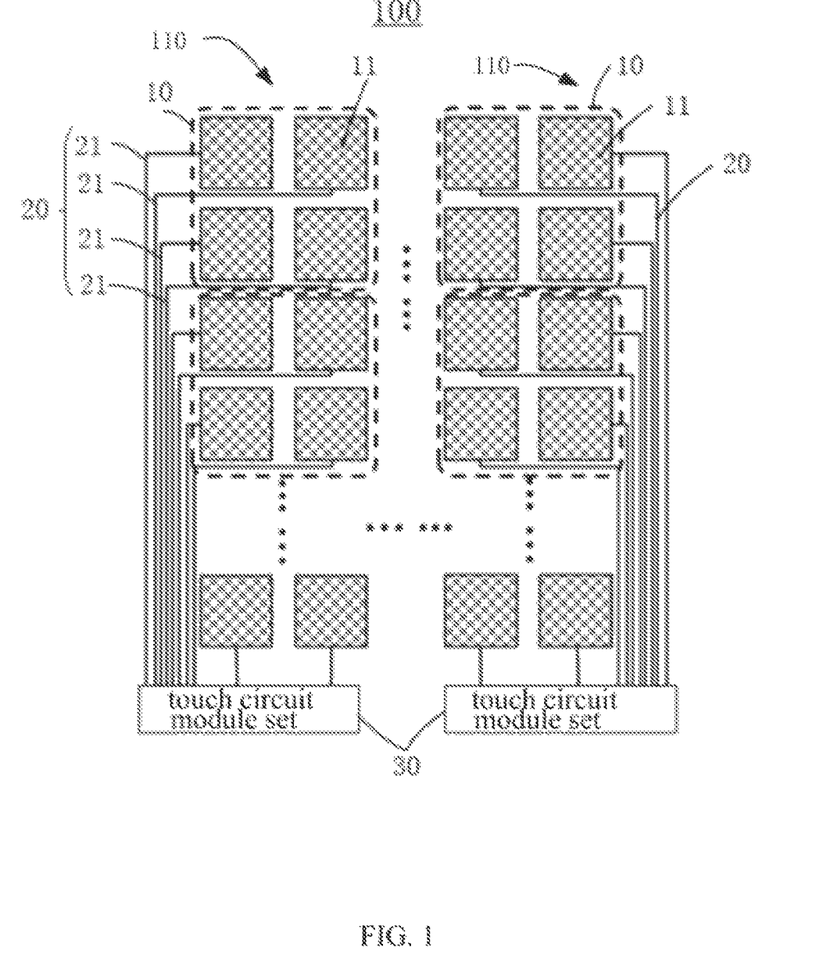
FIG. 1 is a schematic arrangement diagram of touch units and touch units sets of a touch panel provided by a first embodiment of the present disclosure.

The touch panel 100 further includes columns of touch sensing units 110 arranged side by side, wherein each of the columns of touch sensing units 110 includes a plurality of touch sensing unit sets 10, one of the columns of touch sensing units corresponds to a touch circuit module set 30, the touch circuit module set 30 includes m/a touch circuits, wherein a≥1, and a is a positive integer. The number and the arrangement of the touch sensing unit sets 10 in any two of the columns of touch sensing units 110 are the same or different. The number and the arrangement of the touch sensing units 11 in the touch sensing unit set 10 in any two of the columns of touch sensing units 110 are the same or different.

Each of the touch sensing unit sets 10 includes n touch sensing units, and the touch sensing units are used to sense the touch position of a touch element (not shown) and to generate corresponding position information, wherein n≥2 and n is a positive integer. In the present embodiment, outlines of two adjacent touch sensing unit sets 10 do not intersect with each other. Specifically, the number and the arrangement of the touch sensing units 11 in each row in the touch sensing unit set 10 are both the same. In the present embodiment, the outline of each of the touch sensing unit sets 10 is rectangular.

Specifically, referring to FIG. 1, in the present embodiment, each of the touch sensing unit sets 10 includes four touch sensing units 11, that is, n=4. The four touch sensing units 11 are arranged in a preset pattern to form a first pattern to form one touch sensing unit set 10. A plurality of the first patterns are arranged to form a second pattern. Specifically, four touch sensing units 11 are arranged in two rows and two columns, and the touch sensing units 11 in two adjacent rows are arranged corresponding to each other in a one-to-one correspondence. In other embodiments, the arrangement of the four touch sensing units 11 is not limited to be arranged in two rows and two columns, nor to be arranged corresponding to each other in a one-to-one correspondence. The arrangement can be set according to actual needs.

Figure 3:
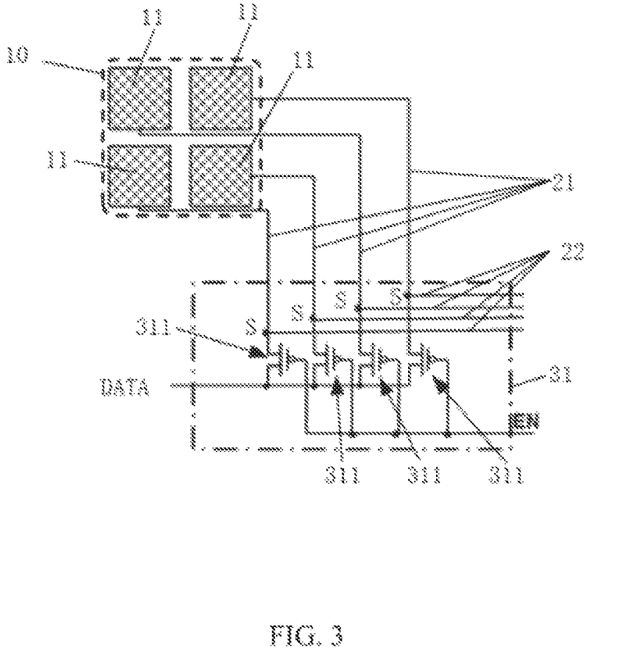
FIG. 3 is an equivalent circuit diagram of the touch circuit shown in FIG. 2 in a second working mode.
Figure 4:
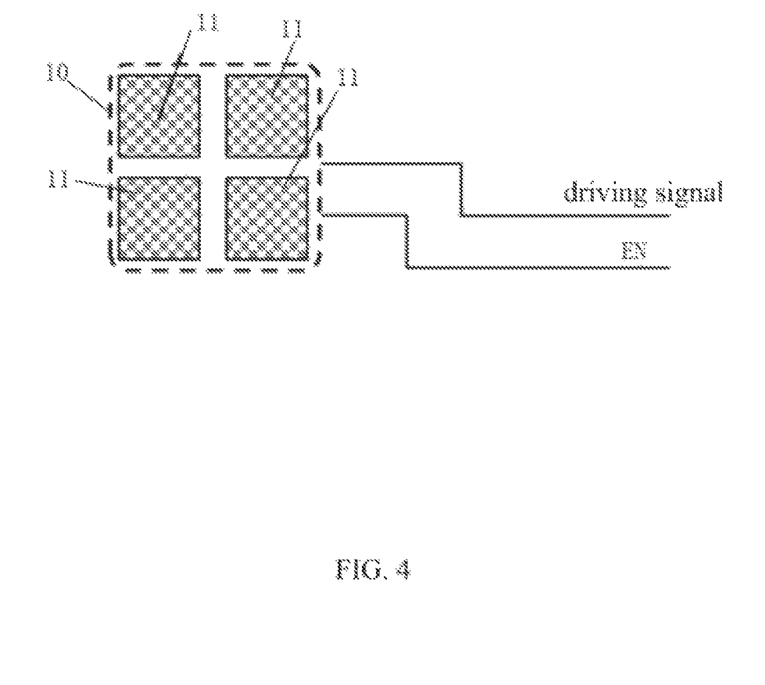
FIG. 4 is a schematic diagram of the touch circuit module set shown in FIG. 1.

Please refer to FIG. 1 and FIG. 3, each of the driving signal line sets 20 includes n driving signal lines, and one driving signal line 21 is electrically connected to one touch sensing unit 11. That is, the plurality of touch sensing units 11 are electrically connected to the touch circuit module set 30 through the plurality of driving signal lines 21, respectively. One end of the n driving signal lines 21 receives a driving signal.

Please refer to FIG. 1 and FIG. 3, each of the driving signal line sets 20 further includes n driving signal access lines 21, an end of each of the driving signal access lines 22 is connected to an end of one corresponding driving signal line 21 away from the touch sensing units 11, and the other end of each of the driving signal access lines 22 is used to receive a driving signal.

Figure 2:
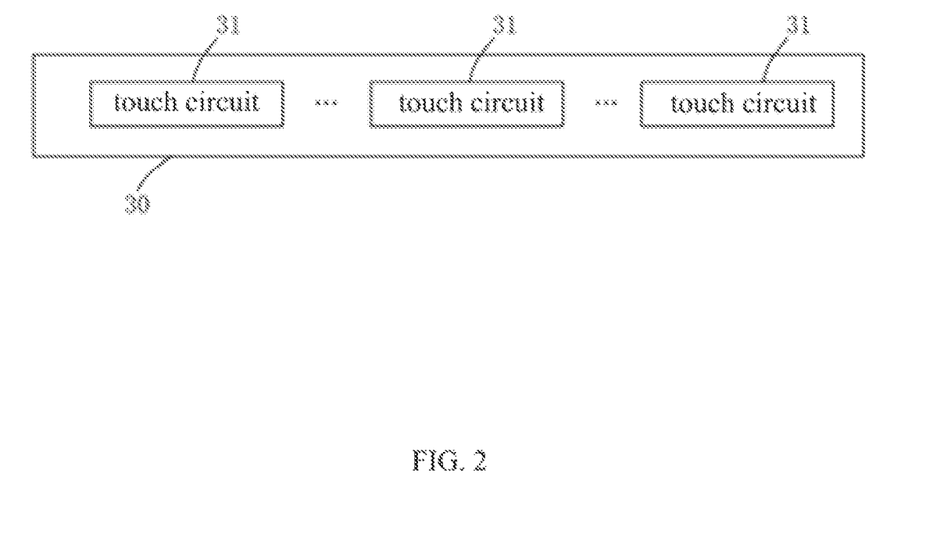
FIG. 2 is schematic diagram of the connection between touch circuits of one touch circuit module set shown in FIG. 1 and touch sensing units of one touch sensing unit set.

Please refer to FIG. 2, each of the touch module sets 30 includes m touch circuits 31, and each of the touch circuit 31 is connected to the n touch sensing units 11 and the n driving signal access lines 21, respectively. The touch circuit 31 includes a first working mode and a second working mode. When the touch circuit 31 operates in the first working mode, the n driving signal lines 21 respectively drive the n touch sensing units 11. When the touch circuit 31 operates in the second working mode, each of the touch circuits 31 is electrically connected to then touch sensing units 11 and then driving signal lines 21, respectively, and any one of the n driving signal lines 21 simultaneously drives the n touch sensing units 11 in one touch sensing unit set 10.

Specifically, each of the touch circuits 31 includes n switching thin film transistors 311. Gates of the switching thin film transistors 311 are connected to each other and used to received controlling signals EN, one of sources and drains of the n switching thin film transistors 311 is connected to another and used to receive data signals DATA, and another one of sources and drains of the n switching thin film transistors 311 is connected to one corresponding driving signal line 21. Specifically, one of sources and drains of each of the switching thin film transistors 311 is electrically connected to an end of one corresponding driving signal line 21 away from the touch sensing unit 11, and another one of sources and drains of the switching thin film transistors 311, one of the driving signals lines 21 and one of the driving signal access lines 22 intersect at point S.

Specifically, in the present embodiment, each of the touch circuits 31 includes four witching thin film transistors 311, that is, n=4.

When the touch circuit 31 operates in the first working mode, the n switching thin film transistors 311 are in a turn off state, the driving signals in the n driving signal lines 21 respectively drive the n touch sensing units 11.

When the touch circuit 31 operates in the second working mode, the n switching thin film transistors 311 are in a turn on state, the driving signal in any one of the n driving signal lines simultaneously drives the n touch sensing units 11 in one touch sensing unit 10.

In one optional embodiment of the present disclosure, the n switching thin film transistors 311 are P-type switching thin film transistors, and when the controlling signals are at a low level, the n switching thin film transistors 311 are turned on.

In one optional embodiment of the present disclosure, the n switching thin film transistors 311 are N-type switching thin film transistors, and when the controlling signals are at a high level, the n switching thin film transistors 311 are turned on.

In one optional embodiment of the present disclosure, the first working mode is responsive to the first application scenario, the second working mode is responsive to the second application scenario, a report rate of the touch panel 100 responsive to the first application scenario is less than a report rate of the touch panel 100 responsive to the second application scenario, and an accuracy of the touch panel 100 responsive to the first application scenario is greater than an accuracy of the touch panel 100 responsive to the second application scenario.

Specifically, the second application scenario may be a scenario of watching a higher-quality movie, playing a game, and the like.

Please refer to FIG. 3 again, the present disclosure further provides a touch circuit 31, and the touch circuit 31 includes n switching thin film transistors 311. Gates of the switching thin film transistors 311 are connected to each other and used to received controlling signals, one of sources and drains of the n switching thin film transistors 311 is connected to another and used to receive data signals DATA, and another one of sources and drains of the n switching thin film transistors 311 is connected to one corresponding driving signal line 21.

When the n switching thin film transistors 311 are in a turn off state, a driving signal in one driving signal line 21 drives one touch sensing units 11.

When the n switching thin film transistors 311 are in a turn on state, the driving signal in any one of the n driving signal lines 21 simultaneously drives the n touch sensing units 11 in one touch sensing unit set 10.

In one optional embodiment of the present disclosure, the switching thin film transistor 311 may be a P-type switching thin film transistor or a N-type switching thin film transistor. When the switching thin film transistor 311 is a P-type switching thin film transistor and the controlling signal EN is at a low level, the switching thin film transistor 311 is turned on.

When the switching thin film transistor 311 is a N-type switching thin film transistor and the controlling signal EN is at a high level, the switching thin film transistor 311 is turned on.

In one optional embodiment of the present disclosure, the touch circuit 31 includes a first working mode responsive to a first application scenario and a second working mode responsive to a second application scenario, a report rate of the touch circuit 31 responsive to the first application scenario is less than a report rate responsive to the second application scenario, and a accuracy of the touch circuit 31 responsive to the first application scenario is greater than a touch accuracy of the touch circuit 31 responsive to the second application scenario.

When the touch circuit 31 is in the first working mode, the n switching thin film transistors 311 are in a turn off state, and when the touch circuit 31 is in the second working mode, the n switching thin film transistors are in a turn on state.

Figure 5:
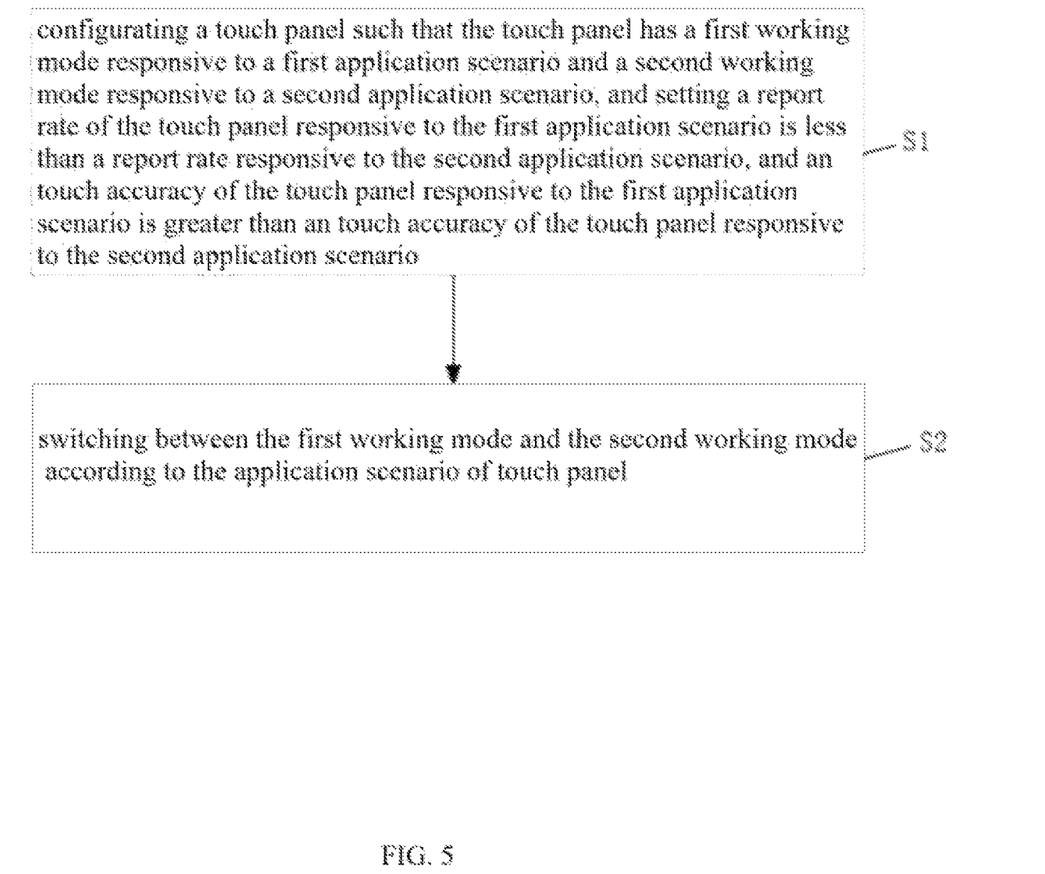
FIG. 5 is a flowchart of a touch driving method provided by the first embodiment of the present disclosure.

Please refer to FIG. 5, the present disclosure further provides a touch driving method, and the touch driving method includes steps of:

Step S1; configurating a touch panel 100 such that the touch panel 100 has a first working mode responsive to a first application scenario and a second working mode responsive to a second application scenario, and setting a report rate of the touch panel responsive to the first application scenario is less than a report rate responsive to the second application scenario, and an touch accuracy of the touch panel responsive to the first application scenario is greater than a touch accuracy of the touch panel responsive to the second application scenario.

Step S2: switching between the first working mode and the second working mode according to the application scenario of touch panel.

Figure 6:
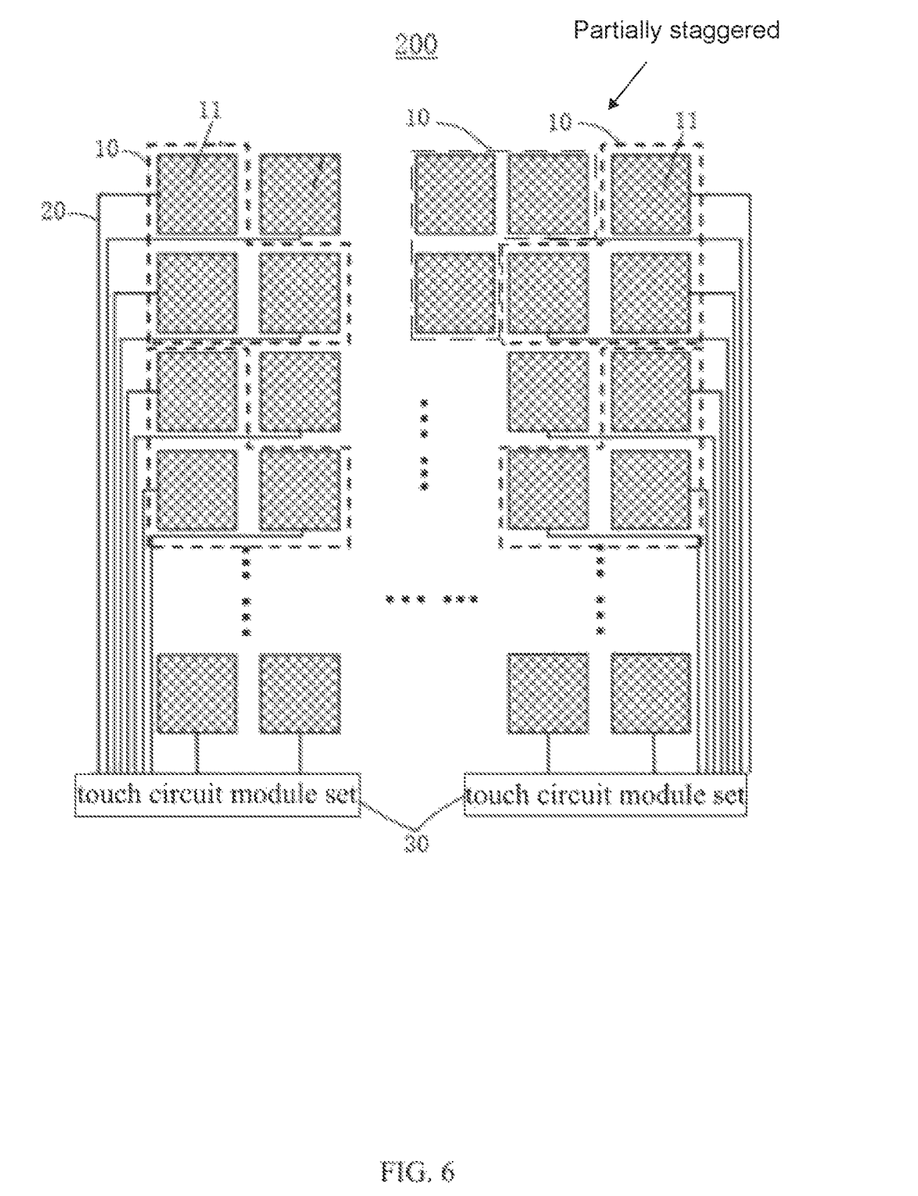
FIG. 6 is schematic arrangement diagram of touch units and touch units sets of another touch panel provided by a second embodiment of the present disclosure.

Please refer to FIG. 6, the present disclosure provides a touch panel 200. The structure of the touch panel 200 is similar to the structure of the touch panel 100. The difference is that outlines of two adjacent touch sensing units 10 of the touch panel 200 partially intersect, and the touch sensing units 11 in two adjacent touch sensing units 10 are partially intersect. Specifically, the number of the touch sensing units 11 in at least one row in the touch sensing unit set 10 is different from the number of the touch sensing units in the other rows. Compared with the case where the outlines of two adjacent touch sensing unit sets 10 of the touch panel 100 do not intersect with each other in the first embodiment, the touch panel 200 provided by the present embodiment has a higher touch accuracy.

In the present embodiment, each of the touch sensing units 10 has an L shape. One of two touch sensing units 10 is presented in a positive L shape, and the other is presented in an inverted L shape. The two touch sensing units 10 are presented in a rectangular-like shape.

In other embodiments, the shape of each of touch sensing units 10 may also have a "⊏" shape other than the L shape. Two of the touch sensing units 10 presented in the "⊏" shape are staggered up and down. Specifically, one of the touch sensor units 10 presented in the "⊏" shape extends into the recess between the two horizontal portions of the other touch sensor unit 10 presented in the "⊏" shape.

In the touch panel, the touch circuit, and the touch driving method provided by the present disclosure, a touch circuit module set 30 is added to the existing touch panel, wherein the plurality of touch circuit 31 in the touch circuit module set 30 are electrically connected to the touch sensing units 11 in the touch sensing unit set 10 through the driving signal lines 21 in the driving signal line set 20, and the touch circuit 31 are electrically connected to the driving signal lines 21 through the plurality of switching thin film transistors 31. By controlling turning on or turning off of the switching thin film transistors 311, in the first working mode responsive to the first application scenario, the touch panel can control one touch sensing unit 11 through one driving signal line 21, and in the second working mode responsive to the second application scenario, the touch panel can simultaneously drive a set of multiple touch sensing units 11 through one driving signal line 21, thereby improving the report rate. In the second working mode responsive to the second application scenario, in the second working mode responsive to the second application scenario, wherein n is the number of the touch sensing units in one touch sensing unit set, and n≥2, which increases the user experience and expands the application of the touch panel. Through the switching characteristics of switching thin film transistors and the support of IC algorithms, the plurality of touch sensing units 11 can be driven as one touch sensing unit set 10, thereby reducing the driving response times and making the signal transmission process faster.

In view of the above, although the present invention has been disclosed by way of preferred embodiments, the above preferred embodiments are not intended to limit the present invention, and one of ordinary skill in the art, without departing from the spirit and scope of the invention, the scope of protection of the present invention is defined by the scope of the claims.

What is claimed is:

1. A touch panel, comprising:
at least one touch sensing unit set, wherein the touch sensing unit set includes at least two touch sensing units, wherein one of the two touch sensing units is presented in a positive L shape, and the other is presented in an inverted L shape, the two touch sensing units are presented in a rectangular-like shape;
at least one driving signal line set, wherein the driving signal line set includes at least two driving signal lines, one of the driving signal lines in the driving signal line set is electrically connected to one of the touch sensing units in the touch sensing unit set; and
at least one touch circuit, the touch circuit corresponding to the driving signal line set; wherein the touch circuit includes at least two switching thin film transistors, gates of the switching thin film transistors in the touch circuit are connected to each other, sources/drains of the switching thin film transistors in the touch circuit are connected to each other, and the drain/source of one of the switching thin film transistors in the touch circuit is electrically connected to one corresponding driving signal line;
wherein outlines of two adjacent touch sensing units are partially staggered, and the number of the touch sensing units in at least one row in the touch sensing unit set is different from the number of the touch sensing units in the other rows.

2. The touch panel according to claim 1, wherein the touch panel comprises m touch sensing unit sets, m driving signal line sets, and m touch circuits, each of the touch sensing unit sets comprises n touch sensing units, each of the driving signal line sets comprises n driving signal lines, and each of the touch circuits comprises n switching thin film transistors, wherein m≥1, n≥2, m and n are both positive integers, the switching thin film transistors correspond to the driving signal lines in a one-to-one correspondence, and the driving signal lines correspond to the touch sensing units in a one-to-one correspondence.

3. The touch panel according to claim 2, wherein each of the driving signal line sets further comprises n driving signal access lines, an end of each of the driving signal access lines is connected to an end of one corresponding driving signal line away from the touch sensing units and the source/drain of one of the switching thin film transistors, and the other end of each of the driving signal access lines receives a driving signal.

4. The touch panel according to claim 2, further comprising columns of touch sensing units arranged side by side, wherein each of the columns of touch sensing units comprises a plurality of touch sensing unit sets, one of the columns of touch sensing units corresponds to a touch circuit module set, the touch circuit module set comprises m/a touch circuits, wherein a≥1, and a is a positive integer.

5. The touch panel according to claim 1, wherein the touch panel comprises m touch sensing unit sets, m driving signal line sets, and m touch circuits, each of the touch sensing unit sets comprises n touch sensing units, each of the driving signal line sets comprises n driving signal lines, and each of the touch circuits comprises n switching thin film transistors, wherein m≥1, n≥2, m and n are both positive integers, the switching thin film transistors correspond to the driving signal lines in a one-to-one correspondence, and the driving signal lines correspond to the touch sensing units in a one-to-one correspondence;
the touch circuit comprises a first working mode and a second working mode; in response to that the touch circuit is switched to the first working mode, the switching thin film transistor is turned off, and each of the driving signal lines drives one corresponding touch sensing unit; in response to that the touch circuit is switched to the second working mode, the switching thin film transistor is turned on, and any one of the driving signal lines in the driving signal line set simultaneously drives all the touch sensing units in the touch sensing unit set.

6. The touch panel according to claim 5, wherein the first working mode is responsive to a first application scenario, the second working mode is responsive to a second application scenario, a report rate of the touch panel responsive to the first application scenario is less than a report rate of the touch panel responsive to the second application scenario, and an accuracy of the touch panel responsive to the first application scenario is greater than an accuracy of the touch panel responsive to the second application scenario.

7. The touch panel according to claim 1, wherein outlines of two adjacent touch sensing unit sets do not stagger with each other, and the number and the arrangement of the touch sensing units in each row in the touch sensing unit set are both the same;
the touch circuit comprises a first working mode and a second working mode; in response to that the touch circuit is switched to the first working mode, the switching thin film transistor is turned off, and each of the driving signal lines drives one corresponding touch sensing unit; in response to that the touch circuit is switched to the second working mode, the switching thin film transistor is turned on, and any one of the driving signal lines in the driving signal line set simultaneously drives all the touch sensing units in the touch sensing unit set.

8. The touch panel according to claim 1, wherein outlines of two adjacent touch sensing units are partially staggered, and the number of the touch sensing units in at least one row in the touch sensing unit set is different from the number of the touch sensing units in the other rows;
the touch circuit comprises a first working mode and a second working mode; in response to that the touch circuit is switched to the first working mode, the switching thin film transistor is turned off, and each of the driving signal lines drives one corresponding touch sensing unit; in response to that the touch circuit is switched to the second working mode, the switching thin film transistor is turned on, and any one of the driving signal lines in the driving signal line set simultaneously drives all the touch sensing units in the touch sensing unit set.

9. A touch driving method, comprising steps of:
configurating a touch panel, so that the touch panel has a first working mode responsive to a first application scenario and a second working mode responsive to a second application scenario, and setting a report rate of the touch panel responsive to the first application scenario is less than a report rate responsive to the second application scenario, and setting a touch accuracy of the touch panel responsive to the first application scenario is greater than a touch accuracy of the touch panel responsive to the second application scenario; wherein the touch panel comprises:
at least one touch sensing unit set, wherein the touch sensing unit set includes at least two touch sensing units, one of the two touch sensing units is presented in a positive L shape, and the other is presented in an inverted L shape, the two touch sensing units are presented in a rectangular-like shape;

at least one driving signal line set, wherein the driving signal line set includes at least two driving signal lines, one of the driving signal lines in the driving signal line set is electrically connected to one of the touch sensing units in the touch sensing unit set; and at least one touch circuit, the touch circuit corresponding to the driving signal line set; wherein the touch circuit includes at least two switching thin film transistors, gates of the switching thin film transistors in the touch circuit are connected to each other, sources/drains of the switching thin film transistors in the touch circuit are connected to each other, and the drain/source of one of the switching thin film transistors in the touch circuit is electrically connected to one corresponding driving signal lines;

wherein outlines of two adjacent touch sensing units are partially staggered, and the number of the touch sensing units in at least one row in the touch sensing unit set is different from the number of the touch sensing units in the other rows; and controlling the turning on and the turning off of the switching thin film transistors in the touch circuit of the touch panel to switch the touch panel between the first working mode and the second working mode, according to the application scenario of the touch panel.

10. The touch driving method according to claim 9, wherein the touch panel comprises m touch sensing unit sets, m driving signal line sets, and m touch circuits, each of the touch sensing unit sets comprises n touch sensing units, each of the driving signal line sets comprises n driving signal lines, and each of the touch circuits comprises n switching thin film transistors, wherein m≥1, n≥2, m and n are both positive integers, the switching thin film transistors correspond to the driving signal lines in a one-to-one correspondence, and the driving signal lines correspond to the touch sensing units in a one-to-one correspondence.

11. The touch driving method according to claim 10, wherein each of the driving signal line sets further comprises n driving signal access lines, an end of each of the driving signal access lines is connected to an end of one corresponding driving signal line away from the touch sensing units and the source/drain of one of the switching thin film transistors, and the other end of each of the driving signal access lines receives a driving signal.

12. The touch driving method according to claim 10, wherein the touch panel further comprises columns of touch sensing units arranged side by side, wherein each of the columns of touch sensing units comprises a plurality of touch sensing unit sets, one of the columns of touch sensing units corresponds to a touch circuit module set, the touch circuit module set comprises m/a touch circuits, wherein a≥1, and a is a positive integer.

13. The touch driving method according to claim 9, wherein the touch panel comprises m touch sensing unit sets, m driving signal line sets, and m touch circuits, each of the touch sensing unit sets comprises n touch sensing units, each of the driving signal line sets comprises n driving signal lines, and each of the touch circuits comprises n switching thin film transistors, wherein m≥1, n≥2, m and n are both positive integers, the switching thin film transistors correspond to the driving signal lines in a one-to-one correspondence, and the driving signal lines correspond to the touch sensing units in a one-to-one correspondence;

the touch circuit comprises a first working mode and a second working mode; in response to that the touch circuit is switched to the first working mode, the switching thin film transistor is turned off, and each of the driving signal lines drives one corresponding touch sensing unit; in response to that the touch circuit is switched to the second working mode, the switching thin film transistor is turned on, and any one of the driving signal lines in the driving signal line set simultaneously drives all the touch sensing units in the touch sensing unit set.

14. The touch driving method according to claim 13, wherein the first working mode is responsive to a first application scenario, the second working mode is responsive to a second application scenario, a report rate of the touch panel responsive to the first application scenario is less than a report rate of the touch panel responsive to the second application scenario, and an accuracy of the touch panel responsive to the first application scenario is greater than an accuracy of the touch panel responsive to the second application scenario.

15. The touch driving method according to claim 13, wherein each of the driving signal line sets further comprises n driving signal access lines, an end of each of the driving signal access lines is connected to an end of one corresponding driving signal line away from the touch sensing units and the source/drain of one of the switching thin film transistors, and the other end of each of the driving signal access lines receives a driving signal.

16. The touch driving method according to claim 9, wherein outlines of two adjacent touch sensing unit sets do not stagger with each other, and the number and the arrangement of the touch sensing units in each row in the touch sensing unit set are both the same;

the touch circuit comprises a first working mode and a second working mode; in response to that the touch circuit is switched to the first working mode, the switching thin film transistor is turned off, and each of the driving signal lines drives one corresponding touch sensing unit; in response to that the touch circuit is switched to the second working mode, the switching thin film transistor is turned on, and any one of the driving signal lines in the driving signal line set simultaneously drives all the touch sensing units in the touch sensing unit set.

\* \* \* \* \*